US011946357B2

(12) United States Patent
Norton et al.

(10) Patent No.: US 11,946,357 B2
(45) Date of Patent: Apr. 2, 2024

(54) CAPTURE AND USE OF WASTE ENERGY

(71) Applicant: Nabors Drilling Technologies USA, Inc., Houston, TX (US)

(72) Inventors: Brenton Norton, Katy, TX (US); Ashish Gupta, Houston, TX (US); Bhargavkumar Patel, Spring, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days.

(21) Appl. No.: 17/820,699

(22) Filed: Aug. 18, 2022

(65) Prior Publication Data

US 2023/0059636 A1 Feb. 23, 2023

Related U.S. Application Data

(60) Provisional application No. 63/260,427, filed on Aug. 19, 2021.

(51) Int. Cl.

| | |
|---|---|
| ***E21B 44/00*** | (2006.01) |
| ***E21B 21/06*** | (2006.01) |
| ***E21B 41/00*** | (2006.01) |
| ***F02G 5/02*** | (2006.01) |

(52) U.S. Cl.
CPC .............. *E21B 44/00* (2013.01); *E21B 21/06* (2013.01); *E21B 41/0085* (2013.01); *F02G 5/02* (2013.01)

(58) Field of Classification Search
CPC ...... E21B 44/00; E21B 21/06; E21B 41/0085; E21B 41/00; F02G 5/02
See application file for complete search history.

(56) References Cited

U.S. PATENT DOCUMENTS

| | | | |
|---|---|---|---|
| 10,570,718 | B2 | 2/2020 | Nguyen et al. |
| 2012/0247942 | A1 | 10/2012 | Curlett et al. |
| 2021/0087914 | A1 | 3/2021 | Nalley, Jr. |
| 2022/0145730 | A1 | 5/2022 | Benson et al. |

*Primary Examiner* — Kristyn A Hall
(74) *Attorney, Agent, or Firm* — Abel Schillinger, LLP

(57) ABSTRACT

Systems and methods are disclosed that can include operating a first rig component at a first location, capturing waste energy from the first rig component at the first location, and redirecting the waste energy to another rig component, another location, or a combination thereof. A method of operating a drilling rig can include operations of determining a power usage profile for a rig based on a digital rig plan; predicting waste energy to be generated during execution of the digital rig plan; and modifying the power usage profile for the rig and the digital rig plan based on the predicted waste energy.

14 Claims, 7 Drawing Sheets

300

| | 70 | 72 |
|---|---|---|
| 12 | Well Plan Activities | Depth |
| 14 | Prespud Meeting with All Rig Personnel | 75 |
| 16 | M/U 5-1/2" DP stands | 75 |
| 18 | 36" HOLE SECTION- 30" CONDUCTOR | 75 |
| 20 | P/up, M/up & RIH with 36" Bit & BHA. | 75 |
| 22 | Drill 36" hole to section TD (+/- 30 ft inside Dammam) - Deviation Survey @ 150', 500', and at TD | 652 |
| 24 | Pump high-viscosity pill. Circulate hole clean. | 652 |
| 26 | Wiper trip: POOH to surface. Clean stabilizers. RIH to bottom. | 652 |
| 28 | Pump High-viscosity pill. Circulate hole clean. Take survey. Pump slug. | 652 |
| 30 | POOH 36" Bit to BHA. | 652 |
| 32 | L/D bit & stiff BHA. R/D DC handling tools | 652 |
| 34 | PJSM. (Pre Job Safety Meeting) | 652 |
| 36 | P/U 30" conductor running tools. | 652 |
| 38 | RIH 30" conductor | 652 |
| 40 | R/D casing handling equipment. Clear rig floor. Install false rotary. R/U work platform and R/U to run DP stinger | 652 |
| 42 | RIH with Stinger on 5-1/2" HWDP & DP with 5-1/2" x 30" centralizer. | 652 |
| 44 | Stab-in float collar. Check floats and seal assembly. | 652 |
| 46 | Circulate & condition mud. Prepare cement mix. PJSM | 652 |
| 48 | R/U cement lines. P/T cement lines to 3000 psi. Perform cement job. Check for back flow. | 652 |
| 50 | Stab-out stinger and check for back flow. Pump slug. Pull and L/D space out assembly. | 652 |
| 52 | POOH cement stinger to surface. R/D cementing equipment. | 652 |
| 54 | Cut windows on 42" conductor. Observe cement level. | 652 |
| 56 | Weld gussets between 42" conductor & 30" casing. Rough cut 30" casing. | 652 |
| 58 | Final cut 42" Conductor, L/D, Final cut & dress 30" casing. Install & Weld 30" SOW x 30" MSS (720psi) Flange. | 652 |
| 60 | Allow to cool. P/T Section A void. | 652 |
| 62 | Weld base plate to 42" conductor. Install 72" pipe around 42" conductor | 652 |
| 64 | Grout 72" stub x 42" conductor annulus with cement. Top up 42" x 30" annulus with slurry | 652 |
| 66 | N/U 30" spacer spool & 29-1/2 diverter | 652 |
| 68 | R/U vent lines and bell nipple. F/T diverter | 652 |
| | PJSM, Pick up DP and rack in derrick for next section. | 652 |

FIG. 2A

CAPTURE AND USE OF WASTE ENERGY

CROSS-REFERENCE TO RELATED APPLICATION(S)

This application claims priority under 35 U.S.C. § 119(e) to U.S. Provisional Application No. 63/260,427, entitled "CAPTURE AND USE OF WASTE HEAT ON A DRILLING RIG," by Brenton NORTON et al., filed Aug. 19, 2021, which is assigned to the current assignee hereof and incorporated herein by reference in its entirety.

BACKGROUND

During well construction operations, tasks on a drilling rig can be organized according to a well plan. The well plan can be converted to a digital rig plan, which is a well construction plan for implementation on a specific rig. Implementation of well construction operations in accordance with the digital rig plan relies on a requisite amount of electrical power to complete the well construction. The electrical power needed to complete the well construction is often a significant portion of the overall cost of completing the well. Accordingly, the industry continues to demand improvement in electrical power delivery and management.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of operating a drilling rig. The method also includes operating a first rig component at a first location; capturing waste energy from the first rig component at the first location; and redirecting the waste energy to a second rig component, a second location, or a combination thereof. Other embodiments of this aspect include corresponding computer systems, apparatus, and computer programs recorded on one or more computer storage devices, each configured to perform the actions of the methods.

One general aspect includes a method of operating a drilling rig. The method also includes determining a power usage profile for a rig based on a digital rig plan; predicting waste energy to be generated during execution of the digital rig plan and modifying the power usage profile for the rig or the digital rig plan based on the predicted waste energy. Other embodiments of this aspect include corresponding computer systems, apparatus, and computer programs recorded on one or more computer storage devices, each configured to perform the actions of the methods.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings.

FIG. 2A is a representative list of well activities for an example digital well plan, in accordance with certain embodiments;

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

As used herein, "tubular" refers to an elongated cylindrical tube and can include any of the tubulars manipulated around a rig, such as tubular segments, tubular stands, tubulars, and tubular string. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

Figure 1:
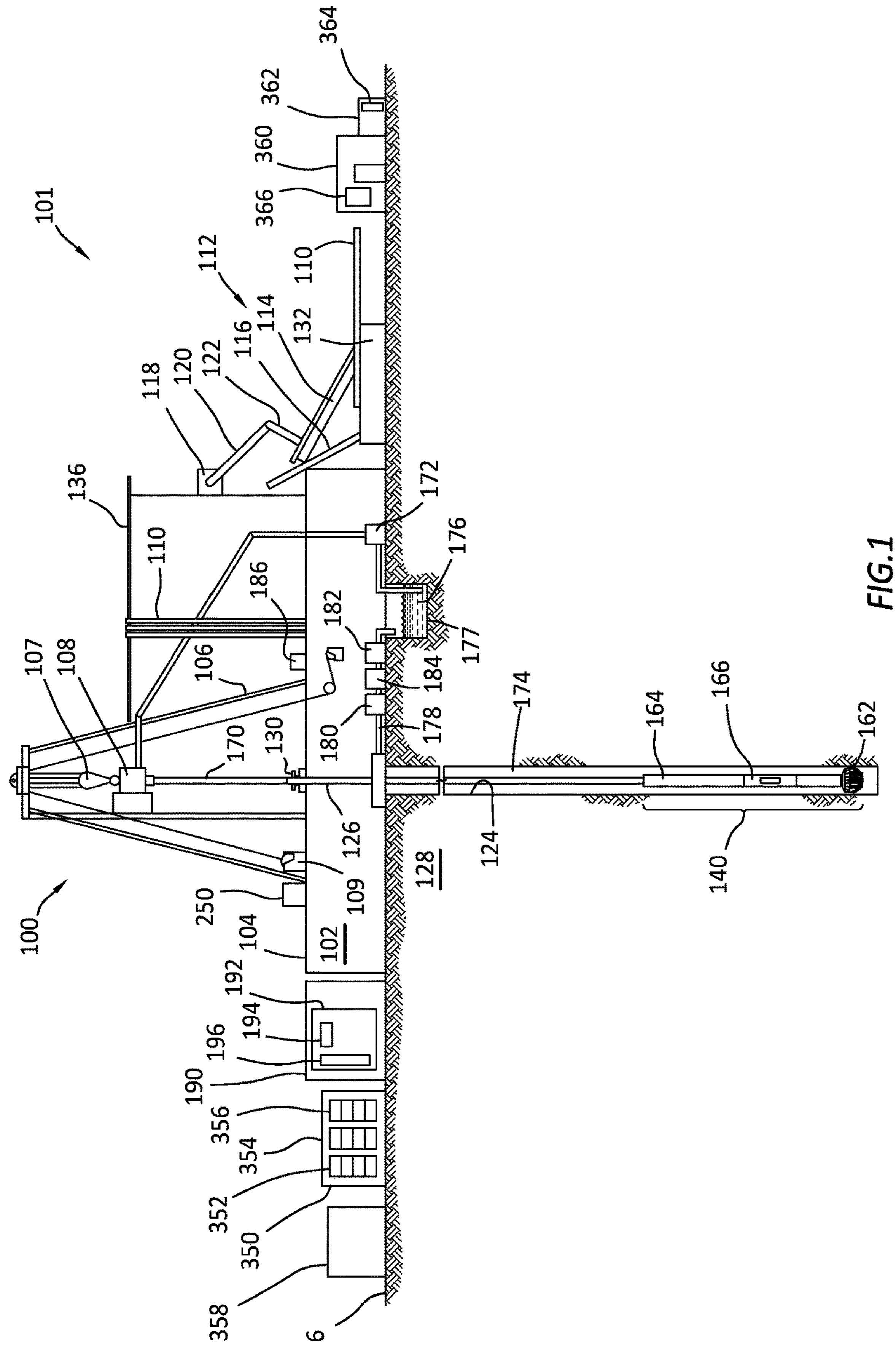
FIG. 1 shows a simplified front view of a rig 100, in accordance with certain embodiments.

FIG. 1 shows a simplified front view of a rig 100 according to an embodiment of the disclosure. The rig 100 may generally be located at a rig site 101 being utilized for subterranean operations, which may include onshore or offshore subterranean operations (e.g., drilling, treating, completing, producing, testing, etc.). The rig site 101 may generally include the rig 100 and the rig equipment, in addition to other equipment and rig site areas used to support the operation of the rig 100 but that are not necessarily located on the rig 100. The rig 100 may generally include a platform 102 having a rig floor 104 and a derrick 106 extending from the rig floor 104. The derrick 106 may provide support for or carry a top drive 108 having a travelling block 107 used to raise and lower the top drive 108 via a drawworks 109. The top drive 108 may generally be used to manipulate tubulars 110. The rig 100 may also include a tubular system 112 that may include a catwalk 114 and V-door ramp 116, which may be used to transfer horizontally stored tubulars 110 to the rig floor 104. The tubular system 112 may also include a pipe handler 118 having one or more articulating arms 120, 122 that may secure the tubular 110 from the catwalk 114 and transfer the tubular 110 to the top drive 108 or a wellbore 124. In some embodiments, the pipe handler 118 may be located on the rig 100. However, in other embodiments, the pipe handler 118 may not be located on the rig 100.

The top drive 108 may manipulate tubulars 110 into the wellbore 124 to form a tubular string 126, with the wellbore 124 extending into the subterranean formation 128. When tripping the tubular string 126 into the wellbore 124, the tubulars 110 may be sequentially added to the tubular string 126 to extend the length of the tubular string 126 into the subterranean formation 128. An iron roughneck 130 may be used to secure or complete a threaded connection between a tubular 110 being added and the tubular string 126. When tripping the tubular string 126 out of the wellbore 124, the tubulars 110 may be sequentially removed from the tubular string 126 to reduce the length of the tubular string 126 in the wellbore 124. The pipe handler 118 may be used to remove the tubulars 110 from the iron roughneck 130 or the top drive 108 and transfer the tubulars 110 to the catwalk 114 and subsequently to a tubular 110 storage area 132. The iron roughneck 130 may be used to break a threaded connection between a tubular 110 being removed and the tubular string 126.

The rig 100 may also comprise a bottom hole assembly (BHA) 140 disposed at the end of the tubular string 126. The BHA 140 may include a drill bit 162 and one or more drill collars 164 which can include instrumentation 166 for logging while drilling (LWD) or measurement while drilling (MWD) operations. The tubular string 126 and the BHA 140 may collectively be referred to as the drill string 170. During drilling operations, drilling mud 176 may be pumped via one or more pumps 172 (e.g., mud or backpressure pumps) into the drill string 170 by supplying the drilling mud 176 through the top drive 108. In some embodiments, the drilling mud 176 may be pumped into the drill string 170 to cool and lubricate the drill bit 162 or transport cuttings to the surface via an annulus 174 formed between the drill string 170 and the wellbore 124. In some embodiments, the returned drilling mud 176 or cuttings may be directed to a so-called mud pit 177 through the flow line 178 and through an optional shale shaker 180. The shale shaker 180 may generally be configured to remove cuttings from the returned drilling mud 176 in order to avoid damage to the drill string 170 potentially caused by the cuttings. In some embodiments, a fluid treatment system 182 may be used to inject additives or add captured heat to the drilling mud 176 to condition the drilling mud 176 appropriately for current or future well activities. In some embodiments, the rig 100 may also comprise a mud gas separation system 184 configured to separate drilling mud 176 from gas entrapped in the mud. In some embodiments, the gas may be burned off or flared by the mud gas separation system 184 or a separate flare gas system 186. Further, the pump 172 may be configured to extract drilling mud 176 from the mud pit 177 and direct it to the top drive 108 to continue the circulation of the drilling mud 176 through the drill string 170. These processes may continue until the wellbore 124 is completely formed or production of hydrocarbons, natural gas, or a combination thereof commences.

The rig 100 may also comprise one or more power sources 190. The power source 190 may generally provide electrical power to one or more components of the rig 100. In some embodiments, the power source 190 may comprise one or more fuel-powered electrical generators 192, electrical grid power (not shown), or a combination thereof. In some embodiments, each fuel-powered electrical generator 192 may comprise at least one engine 194, such as a fuel-powered engine. In some embodiments, each fuel-powered electrical generator 192 may also comprise one or more radiators 196 configured to exchange waste energy (e.g., waste heat, waste kinetic energy, etc.) with the environmental air to cool the one or more engines 194 in the generator 192. In some embodiments, the one or more fuel-powered electrical generators 192 may be located on the rig 100. However, in some embodiments, the one or more fuel-powered electrical generators 192 may be located in proximity to or remotely from the rig site 101.

In some embodiments, the rig 100 may also comprise an energy storage system (ESS) 350 for storing electrical power generated by the power source 190. In some embodiments, the ESS 350 may comprise one or more batteries 352, one or more capacitors 354 (e.g., super-capacitors, ultra-capacitors, etc.), one or more resistors 356, or any combination thereof. In some embodiments, the ESS 350 may be located on the rig 100. However, in some embodiments, the ESS 350 may be located in proximity to or remotely from the rig site 101. Further, it will be appreciated that the ESS 350 may be charged by the power source 190. For example, when power generated by the power source 190 generates more electrical power than required by the components of the rig 100, the ESS 350 (or components 352, 354, 356 thereof) may be charged by the power source 190. When power generated by the power source 190 generates less electrical power than required by the rig 100, the electrical power stored by the ESS 350 may be utilized to power one or more of the components on the rig 100.

When the power source 190 generates more electrical power than required by the rig 100, the excess electrical power can be stored in the ESS 350. If the ESS 350 is fully charged, then the excess electrical power can be seen as waste energy. This waste energy can be dissipated through resistors as heat or used as supplemental power for a rig component that can include an engine, a motor, a drilling or wellbore fluid, a fuel, a heat exchanger, a personnel location, or a combination thereof. The power source 190 can comprise regenerated power that can be provided by a drawworks 109, pipe handlers 118, cranes (not shown), the top drive 108, etc. when they are not consuming power but regenerating power.

In some embodiments, one or more electric power generation units 358 can use unutilized or waste energy from components of rig 100 and can generate electricity to be utilized to power components on rig 100 or charge the ESS 350. In some embodiments, each power generation unit 358 can comprise one or more turbines, pumps, compressors, evaporators, heat exchangers, condensers, or combinations thereof. In some embodiments, the one or more electric power generation units 358 may be located on the rig 100. However, in some embodiments, the one or more Electric power generation units 358 may be located in proximity to or remotely from the rig site 101.

In some embodiments, the rig 100 may also comprise one or more personnel locations 360. Each personnel location 360 may generally comprise an enclosed, temperature-controlled structure. Accordingly, each personnel location 360 may generally be temperature or humidity conditioned by at least one heating, ventilation, or air conditioning (HVAC) system 362. Each HVAC system 362 may comprise one or more heat exchangers 364 configured to exchange waste energy with the environmental air during refrigeration cycles of the HVAC system 362. Furthermore, it will be appreciated that each personnel location 360 may also comprise user operated equipment 366, such as one or more computers, controllers, monitoring systems, or user interfaces. In some embodiments, one or more personnel locations 360 may be located on the rig 100. However, in some embodiments, the one or more personnel locations 360 may be located in proximity to or remotely from the rig site 101.

The rig 100 may also comprise a rig control system 250. The control system 250 may comprise one or more processors or logic devices, storage devices, or user interfaces configured to operate the components of the rig 100 to perform operations of the rig 100. It should be understood that the one or more processors may perform controls or calculations locally or may communicate with a remotely located processor for performing the controls or calculations disclosed herein. Each processor may be communicatively coupled to a non-transitory memory, which can include instructions for the respective processor to read and execute to implement the desired controls or calculations disclosed herein. In some embodiments, the one or more processors may be coupled via a wired or wireless network. In some embodiments, the control system 250 may be in communication with the user operated equipment 366 located in the one or more personnel locations 360. In some embodiments, the control system 250 may be located in a personnel location 360. In some embodiments, the control system 250 may be located on the rig 100. However, in some embodiments, the control system 250 may be located in proximity to or remotely from the rig site 101.

The control system 250 may generally control rig 100 operations including controlling various components of the rig 100. In some embodiments, the control system 250 may control the components of the rig 100 autonomously (e.g., without periodic operator interaction), semi-autonomously (e.g., with limited operator interaction such as initiating a subterranean operation, adjusting parameters during the operation, etc.), manually (e.g., with the operator interactively controlling the rig equipment via remote control interfaces to perform the subterranean operation), or any combination thereof.

The control system 250 may further collect data from various data sources around the rig 100 (e.g., components, sensors, user input, local rig reports, etc.) and from remote data sources (e.g., suppliers, manufacturers, transporters, personnel, remote rig reports, etc.) to monitor and facilitate the execution of a digital well plan. A digital well plan is generally designed to be independent of a specific rig, whereas a digital rig plan is a digital well plan that has been modified to incorporate the specific equipment available on a specific rig to execute the digital well plan on the specific rig, such as the rig 100. Accordingly, the control system 250 may create a digital rig plan 302 for the rig 100 from a digital well plan 300.

Still referring to FIG. 1, the rig 100 may generally be configured to reclaim or recover waste energy from components on the rig 100. More specifically, the rig 100 may be configured to capture waste energy generated by a first component of the rig 100 at a first location (on the rig 100 or in proximity to the rig site 101) and redirect the waste energy to one or more second components of the rig 100, one or more second locations (on the rig 100 or in proximity to the rig site 101). The captured waste energy (e.g., waste heat, kinetic energy, etc.) may be used to improve the efficiency, performance, or startup time of the second component(s) of the rig 100 or decrease the amount of requisite electrical power needed by the second component(s) or the second location(s) to perform drilling and production operations on the rig 100, thereby reducing overall operating expenses on the rig 100.

For example, the recovered or captured waste energy can be used to prevent components from freezing, such as fuel lines, drain lines, storage containers, etc. Also, for example, the captured waste energy can be used to provide heat to personnel workspaces to reduce HVAC heating. Also, for example, the captured waste energy can be used to keep the oil in an offline generator to a desired temperature, so that when the offline generator is brought online to produce power for the rig, the startup time for the offline generator is reduced and the amount of energy needed from alternate sources can be minimized by the shortened startup time. Also, for example, a wellbore fluid (e.g., drilling mud) exiting a wellbore may be of an elevated temperature, and the heat dissipated from the wellbore fluid can be used as waste energy and directed to a second rig component.

Generally, operation of the first component of the rig 100 may produce waste energy. In some embodiments, the waste energy may be captured from at least one of the first rig components. In some embodiments, the waste energy may be captured from a plurality of first rig components. In some embodiments, the first rig component may comprise a fuel-powered electrical generator 192, an engine 194, a shale shaker 180, a mud gas separation system 184, a flare gas system 186, one or more resistor loads 356, one or more radiators 196, an HVAC system 362, one or more heat exchangers 364, wellbore fluid exiting the wellbore 124, or a combination thereof. In some embodiments, the waste energy may be captured via an exhaust of the first rig component, a fluid of the first rig component, a secondary component placed in proximity to the first rig component, or a combination thereof.

Once the waste energy is captured, the waste energy may be redirected to the second rig component. The second rig component can include an engine, a motor, an electric power generation unit, a pump, a compressor, a condenser, a drilling or wellbore fluid, a fluid delivered to an engine, a heat exchanger, a personnel location, or a combination thereof. In some embodiments, the first rig component may be different than the second rig component. In some embodiments, the first rig component may be spaced away from the second rig component. In some embodiments, the first location may be different than the second location. In some embodiments, the first location may be spaced away from the second location.

In some embodiments, the second rig component may comprise a fuel-powered electrical generator 192, an engine 194, a motor of a rig component, a drilling mud or wellbore fluid 176, a fuel, a fluid treatment system 182, a personnel location 360, an HVAC system 362, a heat exchanger 364, or a combination thereof. Accordingly, in some embodiments, the captured waste energy may be directed to the second rig component to increase the temperature, pressure, or flow in the second rig component, increase the temperature, pressure, or flow of a fluid of the second rig component, or a combination thereof. In some embodiments, the captured waste energy may be utilized to maintain an operating temperature of a rig component, a motor, a working fluid of a rig component (e.g., an engine 194 fluid, a motor fluid, etc.), or a combination thereof when not in use to increase a startup speed of the engine 194 or motor, to decrease the amount of energy needed from power sources 190 during startup of the engine 194 or motor, or a combination thereof. In some embodiments, the captured waste energy may be utilized to heat a drilling mud or wellbore fluid 176 prior to injection of the fluid into a wellbore 124. In some embodiments, the captured waste energy may be utilized to heat a fuel prior to injection into an engine 194 or motor. In some embodiments, the captured waste energy may be utilized to heat one or more personnel locations 360 to minimize an HVAC 362 heat load. Further, in some embodiments, the second rig component may comprise an electric power generation unit 358. In such embodiments, the captured waste energy may be passed through the electric power generation unit 358 to generate electricity or charge electrical storage system (ESS) 350 components 352, 354.

The reclamation or recovery of the waste energy on the rig 100 may generally be at least partially implemented by the control system 250, the user operated equipment 366, or a combination thereof. In some embodiments, the control system 250 may monitor a capacity, a temperature, or a combination thereof of the captured waste energy. In some embodiments, the control system 250 may monitor a temperature of the first rig component. In some embodiments, the control system 250 may monitor a temperature of the second rig component, the second location, or a combination thereof. In some embodiments, the control system 250 may control the operation of the first rig component based on the measured capacity, the measured temperature, or a combination thereof of the captured waste energy. In some embodiments, the control system 250 may control the operation of the first rig component based on a comparison between a desired capacity and the measured capacity of the captured waste energy, a desired temperature, and the measured temperature of the captured waste energy, or a combination thereof.

In some embodiments, the control system 250 may utilize the captured waste energy to control a temperature, to improve the efficiency, or a combination thereof of the second rig component. In some embodiments, the control system 250 may redirect the captured waste energy to the second rig component in response to the measured capacity of the captured waste energy exceeding a predetermined threshold capacity, the measured temperature of the captured waste energy exceeding a predetermined threshold temperature, or a combination thereof. In some embodiments, the control system 250 may cease redirection of the captured waste energy to the second rig component in response to the measured capacity of the captured waste energy falling below a predetermined threshold capacity, the measured temperature of the captured waste energy falling below a predetermined threshold temperature, or a combination thereof. In some embodiments, the control system 250 may redirect the captured waste energy to the second rig component in response to the temperature of the second rig component, the temperature of a fluid of the second rig component, or a combination thereof falling below a predetermined threshold temperature. In some embodiments, the control system 250 may cease redirection of the captured waste energy to the second rig component in response to the temperature of the second rig component, the temperature of a fluid of the second rig component, or a combination thereof reaching a predetermined threshold temperature.

Further, in some embodiments, the control system 250 may create or modify the digital rig plan based on the capacity, the temperature, or the combination thereof of the captured waste energy. In some embodiments, the control system 250 may operate the first rig component, the second rig component, or a combination thereof in accordance with the digital rig plan 302 or the modified digital rig plan 302. In some embodiments, the digital rig plan 302 may increase an overall power efficiency of the drilling rig 100.

FIG. 2A is a representative list of well plan activities 70 for an example digital well plan 300. This list of well plan activities 70 can represent the activities needed to execute a full digital well plan 300. However, in FIG. 2A the list of activities 70 is merely a representative subset of a complete list of activities needed to execute a full digital well plan 300 to drill and complete a wellbore 124 to a target depth (TD). The digital well plan 300 can include well plan activities 70 with corresponding wellbore depths 72. However, these activities 70 are not required for the digital well plan 300. More or fewer activities 70 can be included in the digital well plan 300 in keeping with the principles of this disclosure. Therefore, the following discussion relating to the well plan activities 70 is merely an example to illustrate the concepts of this disclosure.

After the rig 100 has been utilized to drill the wellbore 124 to a depth of 75, at activity 12, a Prespud meeting can be held to brief all rig personnel on the goals of the digital well plan 300.

At activity 14, the appropriate personnel and rig equipment can be used to make-up (M/U) 5½" drill pipe (DP) stands in prep for the upcoming drilling operation. This can for example require a pipe handler, horizontal or vertical storage areas for tubular segments, or tubular stands. The primary activities can be seen as the make-up of the drill pipe (DP) stands, with the secondary operations being, for example, availability of tubular segments to build the DP stands; availability of a pipe handler (e.g., pipe handler 118) to manipulate the tubulars; a torquing wrench and backup tong for torquing joints when assembling the DP stands in a mousehole, a horizontal storage area, or a vertical storage area; available space in a storage area for the DP stands; doping compound and doping device available for cleaning and doping threads of the tubulars 110; appropriate personnel to support these operations.

At activity 18, the appropriate personnel and rig equipment can be used to pick up (P/up), makeup (M/up), and run-in hole (RIH) a BHA with a 36" drill bit 162. This can, for example, require BHA components; a pipe handler to assist in the assembly of the BHA components; a pipe handler to deliver BHA to a top drive; and lowering the top drive to run the BHA into the wellbore 124. The primary activities can be seen as assembling the BHA and lowering the BHA into the wellbore 124. The secondary operations can be delivering the BHA components, including the drill bit, to the rig site 101; monitoring the health of the equipment to be used; and ensuring personnel available to perform tasks when needed.

At activity 20, the appropriate personnel and rig equipment can be used to drill 36" hole to a TD of the section, such as 652 ft, to +/−30 ft inside a known formation layer (e.g., Dammam), and performing a deviation survey at depths of 150', 500' and TD (i.e., 652' in this example). The primary activities can be seen as repeatedly feeding tubulars 110 (or tubular stands 110) via a pipe handler 118 to the well center from a tubular storage for connection to a tubular string 126 in the wellbore 124; operating the top drive 108, the iron roughneck 130, and slips to connect tubulars 110 (or tubular stands) to the tubular string 126; cleaning and doping threads of the tubulars 110; running mud pumps to circulate mud through the tubular string 126 to the bit 162 and back up the annulus 174 to the surface; running shakers; injecting mud additives to condition the mud; rotating the tubular string 126 or a mud motor (not shown) to drive the drill bit 162, and performing deviation surveys at the desired depths.

The secondary operations can be seen as having tubulars 110 available in the horizontal storage or vertical storage locations and accessible via the pipe handler. If coming from the horizontal storage 132, then the tubulars 110 can be positioned on horizontal stands, with individuals operating handling equipment, such as forklifts or a crane, to keep the storage area 132 stocked with the tubulars 110. If coming from the vertical storage 136, then the rig personnel, can make sure that enough tubulars 110 are racked in the vertical storage 136 and accessible to the pipe handler 118 (or another pipe handler if needed). Additional secondary operations can be seen as ensuring that the doping compound and doping device are available for cleaning and doping threads of the tubulars 110; mud additives are available for an individual (e.g., mud engineer) or an automated process to condition the mud as needed; the top drive 108 (including drawworks 109), iron roughneck 130, slips, and pipe handlers are operational; and ensuring the power sources 190, 192, 358 are configured to support the drilling operation.

At activity 22, the appropriate personnel and rig equipment can be used to pump a high-viscosity pill through the wellbore 124 via the tubular string 126 and then circulate wellbore 124 clean. The primary activities can be seen as injecting mud additives into the mud to create the high-viscosity pill, mud pumps operating to circulate the pill through the wellbore 124 (down through the tubular string 126 and up through the annulus 174); slips to hold tubular string 126 in place; top drive 108 connected to tubular string 126 to circulate mud; and, after pill is circulated, circulating mud through the wellbore 124 to clean the wellbore 124. The secondary operations can be ensuring the power sources 190, 192, 358 are configured to support the mud circulation activities; the mud pumps 172 are configured to supply the desired pressure and flow rate of fluid to the tubular string 126; and that the mud additives are available for an individual (e.g., mud engineer) or an automated process to condition the mud as needed.

At activity 24, the appropriate personnel and rig equipment can be used to perform a “wiper trip” by pulling the tubular string 126 out of the hole (Pull out of hole—POOH) to the surface 6; clean stabilizers on the tubular string 126; and run the tubular string 126 back into the hole (Run in hole—RIH) to the bottom of the wellbore 124. The primary activities can be seen as operating the top drive 108, the iron roughneck 130, and slips to disconnect tubulars 110 from the tubular string 126; moving the tubulars 110 to vertical storage 136 or horizontal storage 132 via a pipe handler, equipment and personnel to clean the stabilizers; and operating the top drive 108, the iron roughneck 130, and slips to again connect tubulars 110 to the tubular string 126; and run the tubular string 126 back into the wellbore 124.

The secondary operations can be seen as having the top drive 108 (including drawworks 109, travelling block 107, etc.), iron roughneck 130, slips, and pipe handlers operational; ensuring the power sources 190, 192, 350, 358 are configured to support the tripping out and tripping in operations; and ensuring that the appropriate individual(s) and cleaning equipment are available to perform stabilizer cleaning when needed.

At activities 26 thru 68, the appropriate personnel and rig equipment can be used to perform the indicated well plan activities. The primary activities can include the personnel, equipment, or materials needed to directly execute the well plan activities using the specific rig 100. The secondary operations can be those activities that ensure the personnel, equipment, or materials are available and configured to support the primary activities.

Figure 2B:
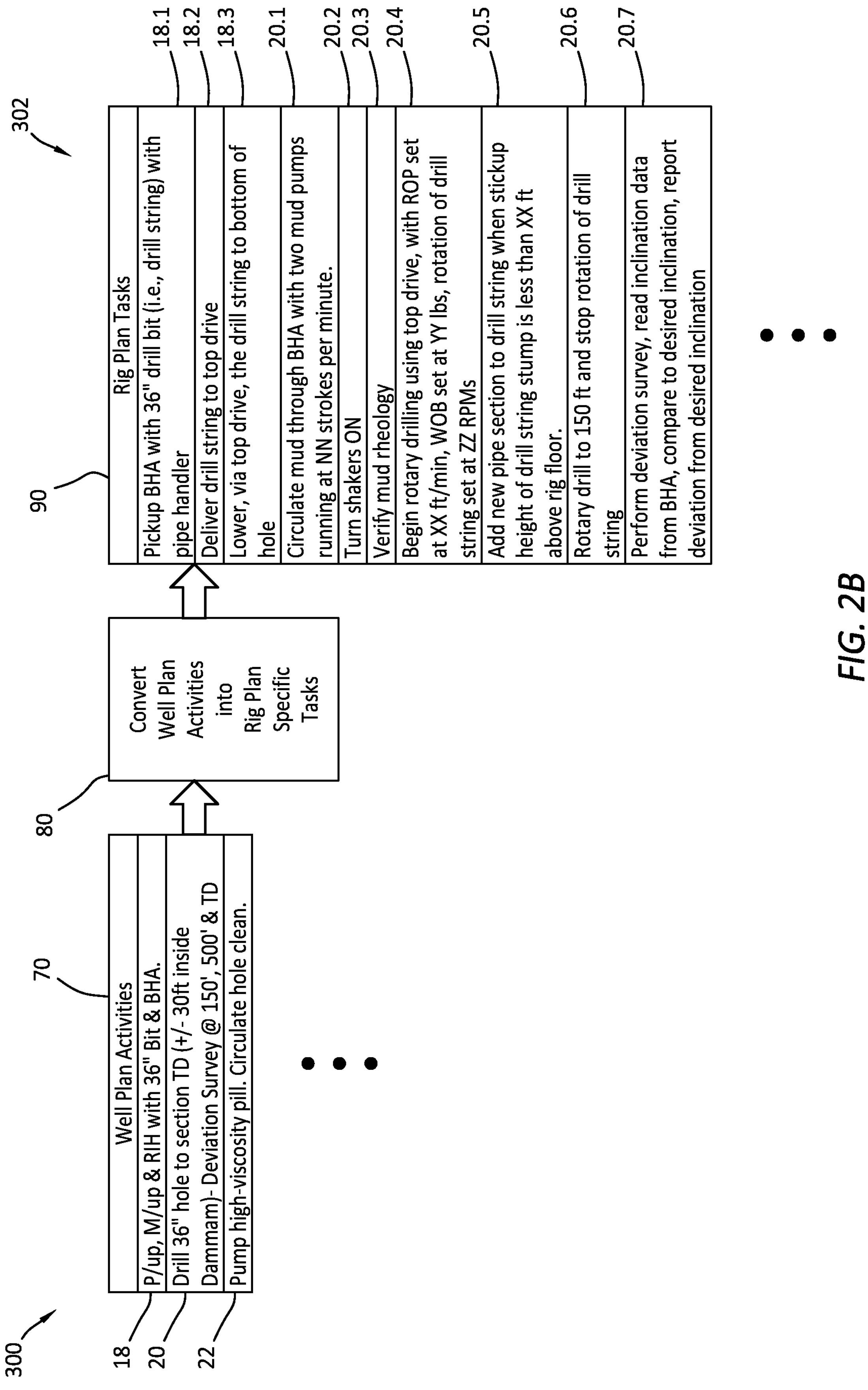
FIG. 2B is a functional diagram that illustrates conversion of well plan activities to rig plan tasks, in accordance with certain embodiments.

FIG. 2B is a functional diagram that can illustrate the conversion of well plan activities 70 to rig plan tasks 90 of a rig specific digital rig plan 302. When a well plan 300 is designed, well plan activities 70 can be included to describe primary activities needed to construct a desired wellbore 124 to a TD. However, the well plan activities 70 are not specific to a particular rig, such as rig 100. It may not be appropriate to use the well plan activities 70 to direct specific operations on a specific rig, such as rig 100. Therefore, a conversion of the well plan activities 70 can be performed to create a list of rig plan tasks 90 of a digital rig plan 302 to construct the desired wellbore 124 using a specific rig, such as rig 100. This conversion engine 80 (which can run on a computing system such as the rig control system 250) can take the non-rig specific well plan activities 70 as an input and convert each of the non-rig specific well plan activities 70 to a series of rig specific tasks 90 to create a digital rig plan 302 that can be used to direct tasks on a specific rig, such as rig 100, to construct the desired wellbore 124.

As way of example, a high-level description of the conversion engine 80 will be described for a subset of well plan activities 70 to demonstrate a conversion process to create the digital rig plan 302. The well plan activity 18 states, in abbreviated form, to pick up, make up, and run-in hole a BHA 140 with a 36" drill bit. The conversion engine 80 can convert this single non-rig specific activity 18 into, for example, three rig-specific tasks 18.1, 18.2, 18.3. Task 18.1 can instruct the rig operators or rig control system 250 to pickup the BHA 140 (which has been outfitted with a 36" drill bit) with a pipe handler. At task 18.2, the pipe handler can carry the BHA 140 and deliver it to the top drive 108, with the top drive 108 using an elevator to grasp and lift the BHA 140 into a vertical position. At task 18.3, the top drive 108 can lower the BHA 140 into the wellbore 124 which has already been drilled to a depth of 75' for this example as seen in FIG. 2A. The top drive 108 can lower the BHA 140 to the bottom of the wellbore 124 to have the drill bit 162 in position to begin drilling as indicated in the following well activity 20.

The well plan 300 activity 20 states, in abbreviated form, to drill a 36" hole to a target depth (TD) of the section, such as 652 ft, to +/−30 ft inside a known formation layer (e.g., Dammam), and performing a deviation survey at depths of 150', 500' and TD (i.e., 652' in this example). The conversion engine 80 can convert this single non-rig specific activity 20 into, for example, seven rig-specific tasks 20.1 to 20.7. Task 20.1 can instruct the rig operators or rig control system 250 to circulate mud through the top drive 108, through the tubular string 126, through the BHA 140, and exiting the tubular string 126 through the drill bit 162 into the annulus 174. For this example, the mud flow requires two mud pumps 172 to operate at “NN” strokes per minute, where “NN” is a desired value that delivers the desired mud flow and pressure. At task 20.2, the shaker tables can be turned on in preparation for cuttings that should be coming out of the annulus 174 when the drilling begins. At task 20.3, a mud engineer can verify that the mud characteristics are appropriate for the current tasks of drilling the wellbore 124. If the rheology indicates that mud characteristics should be adjusted, then additives can be added to adjust the mud characteristics as needed.

At task 20.4, rotary drilling can begin by lowering the drill bit into contact with the bottom of the wellbore 124 and rotating the drill bit by rotating the top drive 108 (e.g., rotary drilling). The drilling parameters can be set to be “XX” ft/min for rate of penetration (ROP), “YY” lbs for weight on bit (WOB), and “ZZ” revolutions per minute (RPM) of the drill bit 162.

At task 20.5, as the wellbore 124 is extended by the rotary drilling, when the top end of the tubular string 126 is less than “XX” ft above the rig floor 104, then a new tubular segment 110 (e.g., tubular, tubular stand, etc.) can be added to the tubular string 126 by retrieving a tubular segment 110 from tubular storage 132, 136 via a pipe handler, stop mud flow and disconnect the top drive 108 from the tubular string 126, hold the tubular string 126 in place via the slips at well center, raise the top drive 108 to provide clearance for the tubular segment to be added, transfer tubular segment 110 from the pipe handler 118 to the top drive 108, connect the tubular segment 110 to the top drive 108, lower the tubular segment 110 to the stump of the tubular string 126 and connect it to the tubular string 126 using a roughneck to torque the connection, then start mud flow. This can be performed each time the top end of the tubular string 126 is lowered below “XX” ft above the rig floor 104.

At task 20.6, add tubular segments 110 to the tubular string 126 as needed in task 20.5 to drill wellbore 124 to a depth of 150 ft. Stop rotation of the drill bit 162 and stop mud pumps 172.

At task 20.7, perform a deviation survey by reading the inclination data from the BHA 140, comparing the inclination data to expected inclination data, and report deviations from the expected. Correct drilling parameters if deviations are greater than a pre-determined limit.

The conversion from a well plan 300 to a rig-specific rig plan 302 can be performed manually or automatically with the best practices and equipment recipes known for the rig that is to be used in the wellbore construction.

Figure 3:
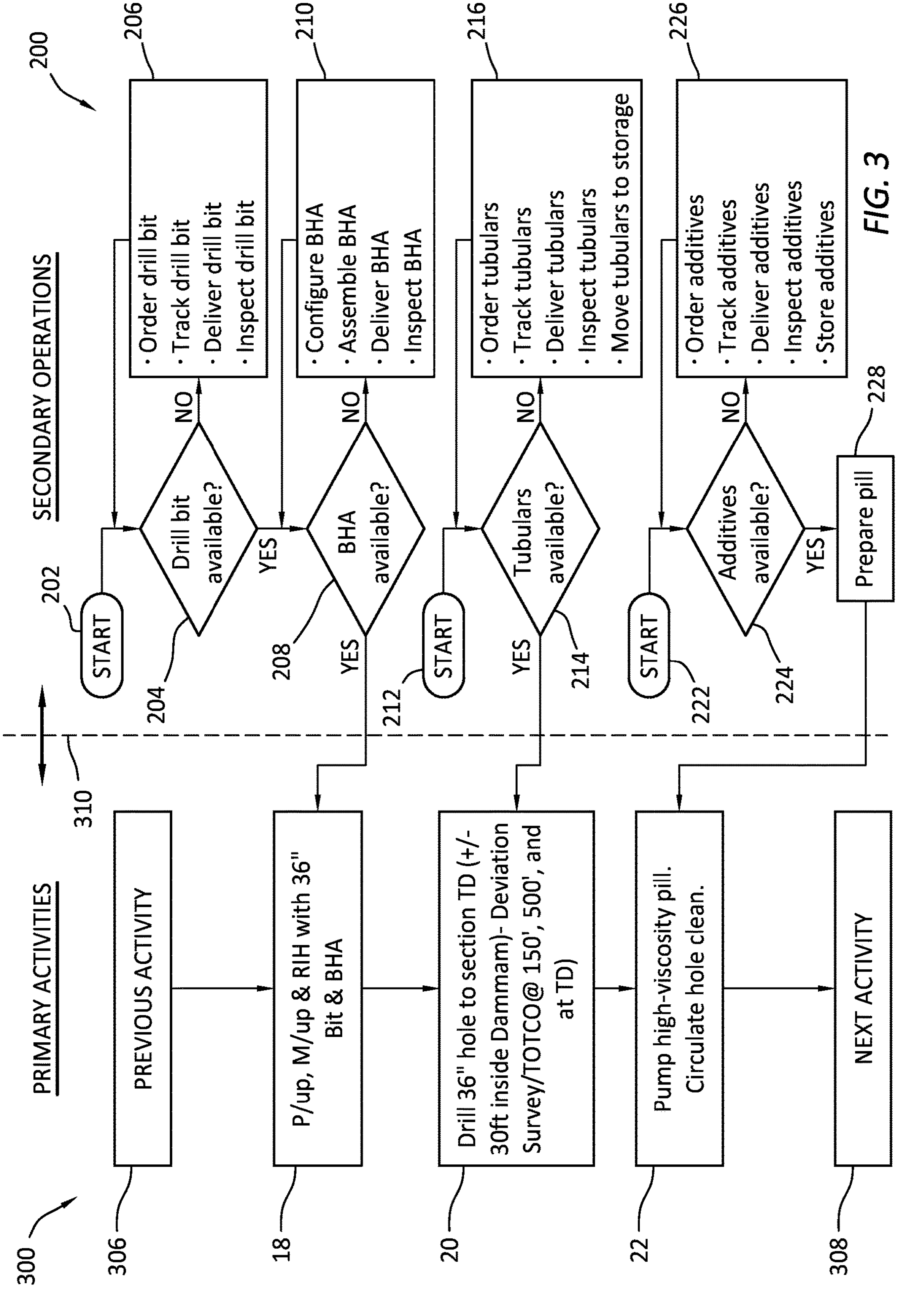
FIG. 3 is a flow diagram that shows secondary operations in support of primary activities, in accordance with certain embodiments.

FIG. 3 is a flow diagram that shows secondary operations occurring at the same time, or at least in parallel, with primary activities, where the secondary operations are tasks that support the execution of the primary activities. Delays in the execution of the primary activities can have a direct impact on the completion of the well plan 300 in the desired amount of time. Secondary operations should not directly impact the completion of the well plan 300 unless they cause delays in the primary activities. If a secondary operation directly impacts a primary activity, then the secondary operation can become a primary activity, since its completion directly impacts well plan completion deadlines.

FIG. 3 shows primary activities that can be executed in sequence as the well plan 300 is executed on the rig 100. After completion of a previous activity 306, the rig can proceed to the activity 18. The appropriate personnel and rig equipment can be used to pick up (P/up), makeup (M/up), and run-in hole (RIH) a BHA with a 36" drill bit 162. However, there can be secondary operations 200 that may need to be performed simultaneously with the previous activity 306 or before the previous activity 306 such that the activity 18 can be performed without delay when the previous activity 306 (for example, activity 14 for making up 5½" DP stands) is completed.

The secondary operations 200 are shown on the right side of the primary/secondary dividing line 310 that symbolically separates the primary activities (shown on the left of the line 310) from the secondary operations. This separation can be maintained as long as the secondary operations do not become primary activities by delaying execution of a primary activity by a delayed completion of the secondary operation.

Regarding the primary activity 18, the BHA components should be available well before they are needed in the primary activity 18. Therefore, secondary operations (e.g., operations 202, 204, 206, 208, 210) should be performed in parallel or prior to the previous activity 306 so that when the previous activity 306 is complete and it is time to execute the activity 18, the BHA 140 is ready to be run-in the hole. Therefore, as way of example, the secondary operations to prepare the BHA 140 for activity 18, in which it is to be used, can start the secondary operations at the operation 202. At operation 204, it is determined whether the desired drill bit 162 (e.g., 36" drill bit in this example) is available for assembly onto the BHA drill collars, if not an appropriate drill bit can be ordered, shipment tracked, delivered to the rig or rig site 101, and inspected at operation 206. Operation 206 can deliver the newly acquired drill bit 162 to a BHA assembly area for attachment to the BHA drill collars. With the drill bit available, the secondary operations can proceed to operation 208 to determine if the BHA is available for use in the activity 18. If not, then operation 210 can be performed to assemble the BHA components together, inspect the BHA and deliver the BHA to a BHA storage area. When the rig is ready to execute the activity 18, then a pipe handler 118 can deliver the BHA to well center, hand it off to the top drive 108, which can then lower the BHA into the wellbore 124.

If the secondary operations are not performed in time to have the BHA available when the activity 18 begins, then the secondary operations can be directly impacting execution times of the primary activities and thereby become primary activities themselves.

Similarly, after completion of the activity 18, the rig can proceed to the activity 20. The appropriate personnel and rig equipment can be used to drill 36" hole to a TD of the section, such as 652 ft, to +/−30 ft inside a known formation layer (e.g., Dammam), and performing a deviation survey at depths of 150', 500' and TD (i.e., 652' in this example). However, there can be secondary operations 200 that may need to be performed simultaneously with the activity 18 or before the activity 18 such that the activity 20 can be performed without delay when the activity 18 is complete.

Regarding activity 20, the primary activities can be seen as repeatedly feeding tubulars 110 via a pipe handler 118 from a tubular storage 132, 136 for connection to a tubular string 126 to the well center; operating the top drive 108, the iron roughneck 130, and slips to connect tubulars 110 to the tubular string 126; cleaning and doping threads of the tubulars 110; running mud pumps to circulate mud through the tubular string 126 to the bit 162 and back up the annulus 174 to the surface; running shakers; injecting mud additives to condition the mud; rotating the tubular string 126 or a mud motor (not shown) to drive the drill bit 162, and performing deviation surveys at the desired depths.

The secondary operations 200 can be seen as having tubulars 110 available in the horizontal storage or vertical storage locations 132, 136 and accessible via the pipe handler 118. If coming from the horizontal storage 132, then the tubulars 110 can be positioned on horizontal stands, with individuals operating handling equipment, such as forklifts or a crane, to keep the storage area 132 stocked with the tubulars 110. If coming from the vertical storage 136, then the rig personnel can make sure that enough tubulars 110 are racked in the vertical storage 136 and accessible to the pipe handler 118 (or another pipe handler if needed). Additional secondary operations can be seen as ensuring that the doping compound and doping device are available for cleaning and doping threads of the tubulars 110; mud additives are available for an individual (e.g., mud engineer) or an automated process to condition the mud as needed; the top drive 108 (including drawworks), iron roughneck 130, slips, and pipe handlers are operational; and ensuring the power sources 190, 192, 358 are configured to support the drilling operation.

As way of example, as shown in FIG. 3, some secondary operations can be to have the necessary tubulars 110 available in a storage area accessible by the top drive or pipe handler so execution of the primary activity 20 can begin as soon as the activity 18 is completed. The secondary operations 212, 214, 216 for providing tubulars for activity 20 can start at the operation 212. At operation 214, it can be determined whether the tubulars 110 are available for extending the tubular string 126 into the wellbore 124 as activity 20 progresses to completion. If not available, or not enough available, appropriate tubulars can be ordered, shipment tracked, delivered to the rig or rig site 101, inspected, and moved to storage areas accessible to the top drive 108 or pipe handler 118 at operation 216.

If tubular stands are needed, then the secondary operations 200 can include an operation of building tubular stands from the tubulars 110. In this particular example, the secondary operations 212, 214, 216 can be performed simultaneously while the primary activity 20 is being performed. The secondary operations 212, 214, 216 need only provide enough tubulars 110 to the tubular storage areas 132, 136 to support when the rig 100 requires the next tubular 110 to be added to the tubular string 126. Therefore, tubulars 110 can be delivered to the storage areas during the time the tubulars are being removed from the storage area to be added to the tubular string 126. The secondary operations 200 do not become primary activities until the top drive 108 or pipe handler 118 cannot retrieve a tubular 110 (or tubular stand) from the storage to continue the primary activity 20. However, the tubulars 110 (or tubular stands) can also be delivered and installed in the storage area prior to the beginning of the activity 20.

Another secondary operation that can occur pertains to replacing damaged or otherwise unusable tubulars 110 with useable tubulars 110 before the rig runs out of available tubulars 110 to support the activity 20.

At primary activity 22, the appropriate personnel and rig equipment can be used to pump a high-viscosity pill through the wellbore 124 via the tubular string 126 and then circulate wellbore 124 clean. The primary activities can be seen as injecting mud additives into the mud to create the high-viscosity pill, mud pumps operating to circulate the pill through the wellbore 124 (down through the tubular string 126 and up through the annulus 174); slips to hold tubular string 126 in place; top drive 108 connected to tubular string 126 to circulate mud; and, after pill is circulated, circulating mud through the wellbore 124 to clean the wellbore 124.

The secondary operations 200 can ensure the power sources 190, 192, 358 are configured to support the mud circulation activities; the mud pumps 172 are configured to supply the desired pressure and flow rate of fluid to the tubular string 126; and that the mud additives are available for an individual (e.g., mud engineer) or an automated process to condition the mud as needed. The digital well plan 300 can then proceed to the next activity 308 (e.g., activity 24).

As way of example, as shown in FIG. 3, some secondary operations 200 can be to have the necessary additives available and accessible to a mud engineer to condition the mud as needed to prepare the pill at operation 228 prior to completion of the primary activity 20 so execution of the primary activity 22 can begin on time. The secondary operations 222, 224, 226, 228 for providing the additives and preparing the pill can start at the operation 222. At operation 224, it can be determined whether the additives are available for conditioning the mud. If not available, additives can be ordered, shipment tracked, delivered to the rig or rig site 101, inspected, and moved to storage for access by the mud engineer or automated process to prepare the pill in operations 228.

It should be understood that these secondary operations 200 can be a subset of the available secondary operations. Many more secondary operations can be required to support the primary activities throughout the execution of the well plan 300 on the rig 100. However, the secondary operations 200 described here can illustrate the interaction between primary activities and secondary operations for executing a well plan 300.

The data sources available to the rig control system 250 can be used to monitor and verify if the secondary operations 200 are being performed in a timely manner to support the particular primary activities 70. Therefore, if the rig control system 250 identifies a secondary operation 200 that is not being completed in time to support upcoming primary activities 70, the rig control system 250 can alert an appropriate individual (e.g., driller, roughneck, operator, company man, mud engineer, etc.) to implement corrective actions to get the appropriate secondary operations 200 completed in time to support the primary activities 70. The rig control system 250 can also act autonomously to initiate corrective actions to correct execution of the secondary operations 200 to minimize or prevent the secondary operations 200 from impacting the execution of the primary activities 70. For example, the rig control system 250 can initiate expedited orders of material to be delivered, turn on other equipment if current equipment is not functioning or otherwise not available, request additional personnel to assist in the execution of the operations 200, etc.

The rig control system 250 can monitor the secondary operations 200 and automatically create and communicate periodic reports to individual(s) or other controllers to inform the individuals or other controllers of the status of the secondary operations 200 and highlight areas of concern related to the timely execution of the secondary operations 200 and identify any of the secondary operations 200 that may impact execution of the primary activities 70. The rig control system 250 can analyze the secondary operations 200 being performed at the rig site 101 and compare them to the digital well plan 300. If more or fewer secondary operations 200 are being performed than indicated by the digital rig plan 302 that is implementing the digital well plan 300, then the rig control system 250 can alert individuals to the mismatch and initiate corrective actions (either automatically, semi-automatically after requesting and receiving user input, or manually via user input) based on the mismatch identified during the comparing.

In addition, some primary operations can be when the primary, secondary, or ESS power sources 190, 192, 358 power the rig equipment being used to execute the current digital rig plan task, while secondary operations can be predicting the electrical power usage of the rig 100 based on the upcoming digital rig plan 302 tasks 90. If the electrical power usage prediction of the rig 100 identifies possible power overages or power shortages, then corrective actions can be taken to address the predicted power issues, such as modifying the digital rig plan 302 to limit equipment usage to reduce power consumption, charge the ESS 350 to capture excess power, or otherwise modify the tasks 90 to accommodate the identified power issues.

Figure 4:
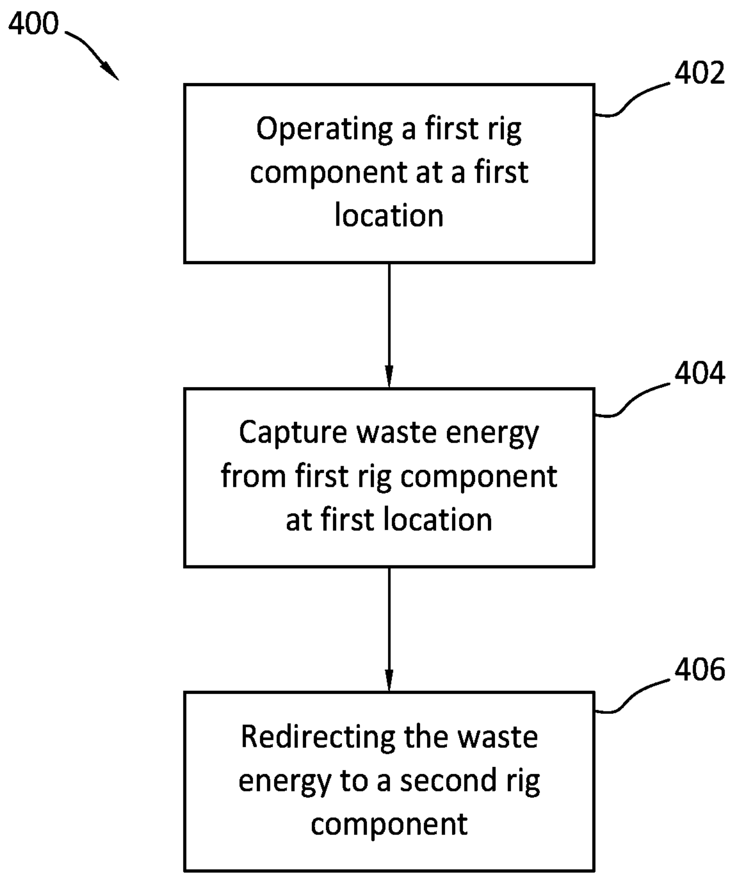
FIG. 4 shows a flowchart of a method 400 of operating a rig, in accordance with certain embodiments.

FIG. 4 shows a flowchart of a method 400 of operating a rig 100 according to an embodiment of the disclosure. The method 400 may begin at operation 402 by operating a first rig component at a first location. In some embodiments, the first rig component may comprise a fuel-powered electrical generator 192, an engine 194, a shale shaker 180, a mud gas separation system 184, a flare gas system 186, one or more resistor loads 356, one or more radiators 196, an HVAC system 362, one or more heat exchangers 364, drawworks 109, pipe handlers 118, or a combination thereof. In some embodiments, the first location may be on the rig 100 or in proximity to the rig site 101. The method 400 may continue at operation 404 by capturing waste energy from the first rig component at the first location. In some embodiments, the waste energy may be captured via an exhaust of the first rig component, a fluid of the first rig component, a second rig component placed in proximity to the first rig component, or a combination thereof.

The method 400 may continue at operation 406 by redirecting the waste energy to a second rig component, a second location, or a combination thereof. In some embodiments, the first rig component may be different than the second rig component. In some embodiments, the first rig component may be spaced away from the second rig component. In some embodiments, the second location may be on the rig 100 or in proximity to the rig site 101. In some embodiments, the first location may be different than the second location. In some embodiments, the first location may be spaced away from the second location. In some embodiments, the second rig component may comprise a fuel-powered electrical generator 192, an engine 194, a motor of a rig component, a drilling mud or wellbore fluid 176, a fuel, a fluid treatment system 182, a personnel location 360, an HVAC system 362, a heat exchanger 364, or a combination thereof.

In some embodiments, the method 400 may also comprise monitoring a capacity, a temperature, or a combination thereof of the captured waste energy, the first rig component, the first location, the second rig component, the second location, or a combination thereof. In some embodiments, the method 400 may comprise controlling operation of the first rig component based on the measured capacity, the measured temperature, or a combination thereof of the captured waste energy. In some embodiments, the method 400 may comprise controlling operation of the first rig component based on a comparison between a desired capacity and the measured capacity of the captured waste energy, a desired temperature, and the measured temperature of the captured waste energy, or a combination thereof.

In some embodiments, the method 400 may also comprise utilizing the captured waste energy to control a temperature, to improve the efficiency, or a combination thereof of the second rig component. In some embodiments, the method 400 may comprise redirecting the captured waste energy to the second rig component in response to the measured capacity of the captured waste energy exceeding a predetermined threshold capacity, the measured temperature of the captured waste energy exceeding a predetermined threshold temperature, or a combination thereof. In some embodiments, the method 400 may comprise ceasing redirection of the captured waste energy to the second rig component in response to the measured capacity of the captured waste energy falling below a predetermined threshold capacity, the measured temperature of the captured waste energy falling below a predetermined threshold temperature, or a combination thereof.

In some embodiments, the method 400 may comprise redirecting the captured waste energy to the second rig component in response to the temperature of the second rig component, the temperature of a fluid of the second rig component, or a combination thereof falling below a predetermined threshold temperature. In some embodiments, the method 400 may comprise ceasing redirection of the captured waste energy to the second rig component in response to the temperature of the second rig component, the temperature of a fluid of the second rig component, or a combination thereof reaching a predetermined threshold temperature.

Further, in some embodiments, the method 400 may comprise creating or modifying the digital rig plan based on the capacity, the temperature, or the combination thereof of the captured waste energy. In some embodiments, the method 400 may comprise operating the first rig component, the second rig component, or a combination thereof in accordance with the digital rig plan or the modified digital rig plan.

Figure 5:
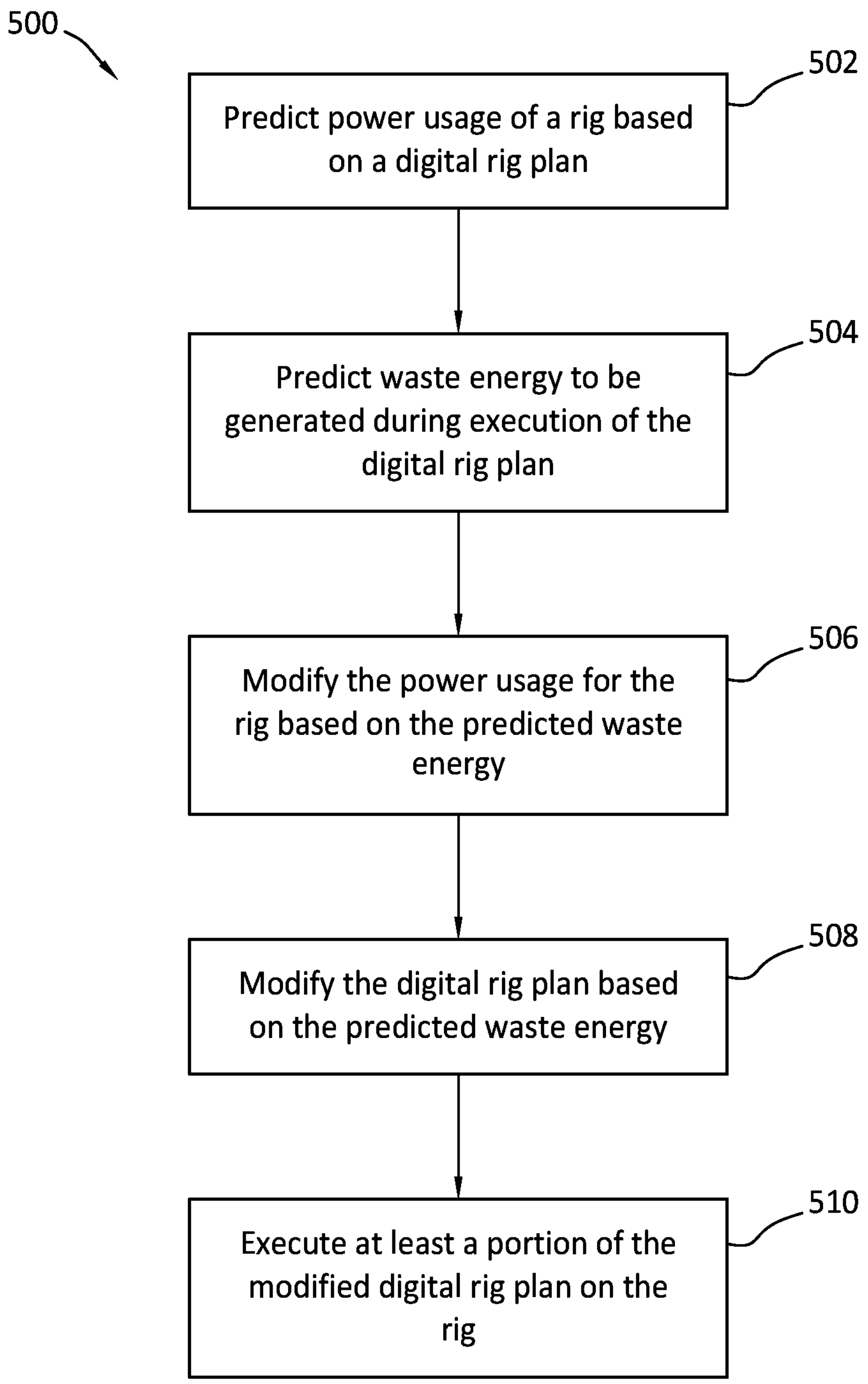
FIG. 5 shows a flowchart of a method 500 of operating a rig, in accordance with certain embodiments.

FIG. 5 shows a flowchart of a method 500 of operating a rig to utilize waste energy or energy generated when rig components are operated during execution of a digital rig plan 302. The method 500 can begin at operation 502 by using the rig control system 250 to predict a power usage profile for a rig based on a digital rig plan. As used herein, the "power usage profile" is a plot of the power usage by rig components vs. time for a digital rig plan 302 executed on the rig 100. This power usage profile can be produced via a digital twin simulation of the rig operations for the digital rig plan 302, through machine learning using historical power usage parameters from previous rig plans, other simulation methods of the digital rig plan 302. In operation 504, the rig control system 250 can predict waste energy to be generated during execution of the digital rig plan 302 by the rig components to be used to execute the digital rig plan 302. The predictions of the power usage profile or the waste energy can be updated during execution of the digital rig plan 302 on the rig 100 if the digital rig plan 302 modified due to rig component failures or operational deficiencies. In operation 506, the predicted waste energy can be used to modify the power usage profile, since more power may be available due to the waste energy generated during operation of the rig components.

In operation 508, the digital rig plan 302 can be modified based on the predicted waste energy. For example, activities may be executed quicker through utilization of the waste energy. In operation 510, the rig control system 250 can execute at least a portion of the modified digital rig plan 302 on the rig 100. The modified digital rig plan 302 takes advantage of the generated waste energy during operation of the rig components used to execute the digital rig plan 302.

Figure 6:
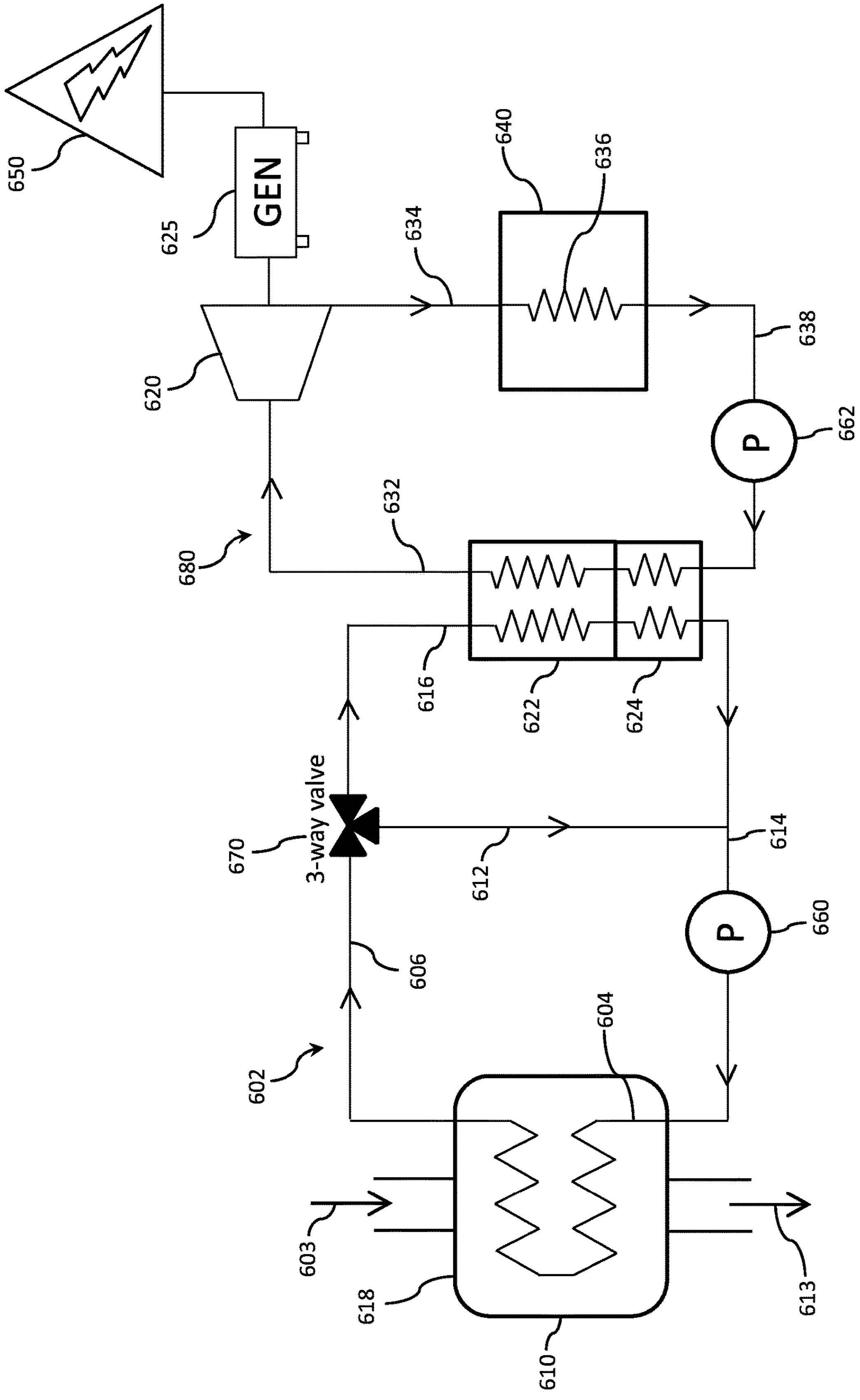
FIG. 6 is a representative functional block diagram of a system 600 for capturing and using waste energy, in accordance with certain embodiments.

FIG. 6 is a representative functional block diagram of a system 600 for capturing and using waste energy. In this example system for capturing and using waste energy, the exhaust from a fuel-powered genset can be coupled, via flow passage 618, to an exhaust gas heat exchanger 610. The exhaust gas heat exchanger 610 can include a closed loop fluid circulation system (CLFS) 602 that circulates fluid, via a pump 660, through the flow paths 604, 606, 612, 614, 616. Flow of the fluid through the CLFS 602 flow paths 604, 606, 612, 614, 616 receives heat from the generator exhaust 603 via the heat exchanger 610. A 3-way valve 670 can be used to divert the heated fluid received from the heat exchanger 610 via the flow path 606 through the evaporators 622, 624, via flow path 616, or through flow path 612 to bypass the evaporators 622, 624.

If the heated fluid from the flow path 606 is diverted to the flow path 616, then the heated fluid can flow through the evaporator 622 (and possibly an optional pre-evaporator 624), where the heat from the heated fluid can be transferred to another fluid flowing through the CLFS 680, which includes flow paths 632, 634, 636, 638. The fluid in the flow path 632 can be pumped to the evaporators 622, 624 via the pump 662 and can evaporate in the evaporators 622, 624. The heated fluid in the flow path 632 can be used to drive a turbine 620 to generate electrical power 650, which can be used to power one or more electric loads, or charge the ESS 350, or used in other ways, such as heating fluid in an offline generator.

The heated and expanded fluid can flow through the flow path 634 from the turbine 620 to the condenser 640 which can remove heat from the fluid that flows through the flow path 636, which is routed through the condenser 640. With the fluid cooled by the condenser 640, it will condense back to a liquid state and flow back to the evaporators 622, 624 via the flow path 638, to again be heated. This closed loop process can continue as long as heat is being provided by the generator exhaust 603. This is a non-limiting embodiment of the systems and methods provided in this disclosure. This embodiment is provided for discussion purposes and is not to limit this disclosure. Many other examples are provided in this disclosure.

VARIOUS EMBODIMENTS

It will be appreciated that a drilling rig 100 or a method 400 of operating a drilling rig 100 disclosed herein may include one or more of the following embodiments:

Embodiment 1. A method of operating a drilling rig, comprising:

operating a first rig component at a first location;

capturing waste energy from the first rig component at the first location; and redirecting the waste energy to a second rig component, a second location, or a combination thereof.

Embodiment 2. The method of embodiment 1, wherein the first rig component is different than the second rig component.

Embodiment 3. The method of any one of embodiments 1 to 2, wherein the first rig component is spaced away from the second rig component.

Embodiment 4. The method of any one of embodiments 1 to 3, wherein the first location is different than the second location.

Embodiment 5. The method of any one of embodiments 1 to 4, wherein the first location is spaced away from the second location.

Embodiment 6. The method of any one of embodiments 1 to 5, wherein the first rig component comprises an engine, a fuel-powered electrical generator, a flare gas system, an HVAC system, a mud gas separation system, a shale shaker, one or more resistor loads, one or more radiators or heat exchangers, or a combination thereof.

Embodiment 7. The method of any one of embodiments 1 to 6, wherein the waste energy is captured via an exhaust of the first rig component, a fluid of the first rig component, a secondary component placed in proximity to the first rig component, or a combination thereof.

Embodiment 8. The method of any one of embodiments 1 to 7, wherein the waste energy is captured from a plurality of first rig components.

Embodiment 9. The method of any one of embodiments 1 to 8, wherein the second rig component comprises one of an engine, a motor, an electric power generation unit, a pump, a compressor, a condenser, a drilling or wellbore fluid, a fluid delivered to an engine, a heat exchanger, a personnel location, and a combination thereof.

Embodiment 10. The method of any one of embodiments 1 to 9, wherein the captured waste energy is directed to the second rig component to increase a temperature of the second rig component, increase a temperature of a fluid of the second rig component, or a combination thereof.

Embodiment 11. The method of embodiment 10, wherein the captured waste energy is utilized to maintain a proper operating temperature of an engine, a motor, an engine fluid, a motor fluid, or a combination thereof when not in use to increase a startup speed of the engine or motor, to decrease an amount of energy needed from power sources during startup of the engine or motor, or a combination thereof.

Embodiment 12. The method of embodiment 10, wherein the captured waste energy is utilized to heat a drilling or wellbore fluid prior to injection the fluid into a wellbore.

Embodiment 13. The method of embodiment 10, wherein the captured waste energy is utilized to heat a fuel prior to injection into an engine or motor.

Embodiment 14. The method of embodiment 10, wherein the captured waste energy is utilized to heat one or more personnel locations to minimize an HVAC heat load.

Embodiment 15. The method of any one of embodiments 1 to 14, wherein the second rig component comprises a turbine.

Embodiment 16. The method of embodiment 15, wherein the captured waste energy is passed through the turbine to generate electricity or charge electrical storage system (ESS) components.

Embodiment 17. The method of any one of embodiments 1 to 16, wherein the drilling rig comprises a control system.

Embodiment 18. The method of embodiment 17, wherein the control system is configured to monitor a capacity, a temperature, or a combination thereof of the captured waste energy.

Embodiment 19. The method of any one of embodiments 17 to 18, wherein the control system is configured to monitor a temperature of the first rig component.

Embodiment 20. The method of any one of embodiments 17 to 19, wherein the control system is configured to monitor a temperature of the second rig component, the second location, or a combination thereof.

Embodiment 21. The method of any one of embodiments 18 to 20, wherein the control system is configured to control operation of the first rig component based on a measured capacity, a measured temperature, or a combination thereof of the captured waste energy.

Embodiment 22. The method of any one of embodiments 18 to 21, wherein the control system is configured to control operation of the first rig component based on a comparison between a desired capacity and the measured capacity of the captured waste energy, a desired temperature, and the measured temperature of the captured waste energy, or a combination thereof.

Embodiment 23. The method of any one of embodiments 17 to 22, wherein the control system is configured to utilize the captured waste energy to control a temperature, to improve an efficiency, or a combination thereof of the second rig component.

Embodiment 24. The method of any one of embodiments 18 to 23, wherein the control system is configured to redirect the captured waste energy to the second rig component in response to the measured capacity of the captured waste energy exceeding a predetermined threshold capacity, the measured temperature of the captured waste energy exceeding a predetermined threshold temperature, or a combination thereof.

Embodiment 25. The method of any one of embodiments 18 to 24, wherein the control system is configured to cease redirection of the captured waste energy to the second rig component in response to the measured capacity of the captured waste energy falling below a predetermined threshold capacity, the measured temperature of the captured waste energy falling below a predetermined threshold temperature, or a combination thereof.

Embodiment 26. The method of any one of embodiments 18 to 25, wherein the control system is configured to redirect the captured waste energy to the second rig component in response to the temperature of the second rig component, the temperature of a fluid of the second rig component, or a combination thereof falling below a predetermined threshold temperature.

Embodiment 27. The method of any one of embodiments 18 to 26, wherein the control system is configured to cease redirection of the captured waste energy to the second rig component in response to the temperature of the second rig component, the temperature of a fluid of the second rig component, or a combination thereof reaching a predetermined threshold temperature.

Embodiment 28. The method of any one of embodiments 18 to 27, wherein the control system is configured to create a digital rig plan based on the capacity, the temperature, or the combination thereof of the captured waste energy.

Embodiment 29. The method of embodiment 28, wherein the control system is configured to operate the first rig component, the second rig component, or a combination thereof in accordance with the digital rig plan.

Embodiment 30. The method of any one of embodiments 28 to 29, wherein the digital rig plan increases an overall power efficiency of the drilling rig.

Embodiment 31. The method of any one of embodiments 1 to 30, wherein the drilling rig comprises an onshore drilling rig.

Embodiment 32. The method of any one of embodiments 1 to 31, wherein the drilling rig comprises an offshore drilling rig.

Embodiment 33. A method of operating a drilling rig, comprising:

- determining a power usage profile for a rig based on a digital rig plan;
- predicting waste energy to be generated during execution of the digital rig plan; and
- modifying the power usage profile for the rig based on the predicted waste energy.

Embodiment 34. The method of embodiment 33, further comprising:

- modifying the digital rig plan to produce a modified digital rig plan based on the predicted waste energy; and
- executing at least a portion of the modified digital rig plan on the rig.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed is not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of operating a rig, comprising:

- operating a first rig component at a first location;
- capturing waste energy from the first rig component at the first location; and
- redirecting the waste energy to a second rig component, a second location, or a combination thereof, wherein a control system is configured to control operation of the first rig component based on a comparison between a desired capacity and a measured capacity of the captured waste energy, a desired temperature and a measured temperature of the captured waste energy, or a combination thereof.

2. The method of claim 1, wherein the first rig component is different than the second rig component.

3. The method of claim 1, wherein the first rig component is spaced away from the second rig component.

4. The method of claim 1, wherein the first rig component comprises an engine, a fuel-powered electrical generator, a flare gas system, a heating, ventilation, and air conditioning (HVAC) system, a mud gas separation system, a shale shaker, one or more resistor loads, one or more radiators or heat exchangers, or a combination thereof.

5. The method of claim 1, wherein the waste energy is captured via an exhaust of the first rig component, a fluid of the first rig component, a secondary component placed in proximity to the first rig component, or a combination thereof.

6. The method of claim 1, wherein the second rig component comprises one of an engine, a motor, an electric power generation unit, a pump, a compressor, a condenser, a drilling or wellbore fluid, a fluid delivered to an engine, a heat exchanger, a personnel location, and a combination thereof.

7. The method of claim 1, wherein the captured waste energy is directed to the second rig component to increase a temperature of the second rig component, to change a temperature or flow of a fluid of the second rig component, or a combination thereof.

8. The method of claim 7, wherein the captured waste energy is utilized to maintain an operating temperature of an engine, a motor, an engine fluid, a motor fluid, or a combination thereof when not in use to increase a startup speed of the engine or motor, to decrease an amount of energy needed from power sources, or a combination thereof.

9. The method of claim 7, wherein the captured waste energy is utilized to heat a drilling or wellbore fluid prior to injection of the fluid into a wellbore, to heat a fluid prior to injection into an engine or motor, or to heat one or more personnel locations to minimize a heating, ventilation, and air conditioning (HVAC) system heat load, improve a performance of the HVAC system, improve efficiency of the HVAC system, or combinations thereof.

10. The method of claim 1, wherein the second rig component comprises a turbine, and wherein the captured waste energy is passed through the turbine to generate electricity or charge electrical storage system (ESS) components.

11. The method of claim 1, wherein a control system is configured to utilize the captured waste energy to control a temperature, to improve an efficiency, or a combination thereof of the second rig component.

12. The method of claim 1, wherein a control system is configured to create or modify a digital rig plan based on a capacity, a temperature, or a combination thereof of the captured waste energy, and wherein the control system is configured to operate the first rig component, the second rig component, or a combination thereof in accordance with the digital rig plan.

13. A method of operating a rig, comprising:

operating a first rig component at a first location;

capturing waste energy from the first rig component at the first location; and redirecting the waste energy to a second rig component, a second location, or a combination thereof, wherein a control system is configured to redirect the captured waste energy to the second rig component in response to a measured capacity of the captured waste energy exceeding a predetermined threshold capacity, a measured temperature of the captured waste energy exceeding a predetermined threshold temperature, or a combination thereof, or wherein the control system is configured to cease redirection of the captured waste energy to the second rig component in response to a measured capacity of the captured waste energy falling below a predetermined threshold capacity, a measured temperature of the captured waste energy falling below the predetermined threshold temperature, or a combination thereof.

14. A method of operating a rig, comprising:

operating a first rig component at a first location;

capturing waste energy from the first rig component at the first location; and redirecting the waste to a second rig component, a second rig location, or a combination thereof, wherein a control system is configured to redirect the captured waste energy to the second rig component in response to a temperature of the second rig component, a temperature of a fluid of the second rig component, or a combination thereof falling below a predetermined threshold temperature, or wherein the control system is configured to cease redirection of the captured waste energy to the second rig component in response to a temperature of the second rig component, a temperature of a fluid of the second rig component, or a combination thereof reaching the predetermined threshold temperature.

* * * * *